United States Patent
Amano et al.

(10) Patent No.: US 10,598,277 B2
(45) Date of Patent: Mar. 24, 2020

(54) CONTROL DEVICE THAT HANDLES ERRONEOUS CLUTCH ENGAGEMENT

(71) Applicants: JATCO Ltd, Fuji-shi, Shizuoka (JP); NISSAN MOTOR CO., LTD., Yokohama-shi, Kanagawa (JP)

(72) Inventors: Norihira Amano, Fuji (JP); Youji Itou, Sagamihara (JP); Masahiro Hamano, Atsugi (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 54 days.

(21) Appl. No.: 16/073,513

(22) PCT Filed: Jan. 27, 2017

(86) PCT No.: PCT/JP2017/002867
§ 371 (c)(1),
(2) Date: Jul. 27, 2018

(87) PCT Pub. No.: WO2017/131134
PCT Pub. Date: Aug. 3, 2017

(65) Prior Publication Data
US 2019/0040949 A1 Feb. 7, 2019

(30) Foreign Application Priority Data
Jan. 29, 2016 (JP) .................. 2016-016443

(51) Int. Cl.
*B60W 20/15* (2016.01)
*F16H 61/12* (2010.01)
(Continued)

(52) U.S. Cl.
CPC ............. *F16H 61/12* (2013.01); *B60W 10/06* (2013.01); *B60W 10/08* (2013.01);
(Continued)

(58) Field of Classification Search
None
See application file for complete search history.

(56) References Cited

U.S. PATENT DOCUMENTS

| 9,353,858 | B2 * | 5/2016 | Kinoshita | ............. F16H 61/662 |
| 9,671,015 | B2 * | 6/2017 | Kinoshita | ........... B60W 50/038 |
| 2018/0335134 | A1 * | 11/2018 | Ohgata | .................. F16H 61/12 |

FOREIGN PATENT DOCUMENTS

| JP | 2008-074226 A | 4/2008 |
| JP | 2012-206663 A | 10/2012 |

* cited by examiner

*Primary Examiner* — Dirk Wright
(74) *Attorney, Agent, or Firm* — Foley & Lardner LLP (57) ABSTRACT

In a vehicle in which a continuously variable transmission, which is connected to an electric motor via a clutch, is operated using oil pressure of an oil pump driven by the motor, erroneous engagement of the clutch is quickly determined. The vehicle has the motor serving as a vehicle driving source, the oil pump connected to the motor, the continuously variable transmission, the clutch interposed between the motor and the continuously variable transmission, a clutch control means for controlling the clutch such that the clutch enters into a completely-engaged, slip-engaged, or release state, and a vehicle control means for controlling the motor such that the motor rotates at a target rotation speed. Also provided is an erroneous engagement handling control means that executes torque adjustment control to decrease an output torque of the vehicle driving source when the clutch is determined to be in an erroneously completely engaged state.

8 Claims, 7 Drawing Sheets

(51) Int. Cl.
*F16H 63/50* (2006.01)
*F16H 61/662* (2006.01)
*B60W 10/06* (2006.01)
*B60W 10/08* (2006.01)
*B60W 10/107* (2012.01)
*F16H 59/70* (2006.01)
*F16H 59/68* (2006.01)

(52) U.S. Cl.
CPC .......... *B60W 10/107* (2013.01); *B60W 20/15* (2016.01); *F16H 61/662* (2013.01); *F16H 61/66272* (2013.01); *F16H 63/50* (2013.01); *B60L 2240/421* (2013.01); *B60L 2240/423* (2013.01); *F16H 2059/6807* (2013.01); *F16H 2059/702* (2013.01); *F16H 2059/704* (2013.01); *F16H 2061/1276* (2013.01); *F16H 2061/1284* (2013.01)

CONTROL DEVICE THAT HANDLES ERRONEOUS CLUTCH ENGAGEMENT

TECHNICAL FIELD

The present invention relates to an erroneous clutch engagement handling control device that determines erroneous engagement (an unreleasable state, an erroneously completely engaged state) of a clutch interposed between an electric motor and a hydraulically-operated continuously variable transmission, and handles and copes with the erroneous engagement.

BACKGROUND ART

A hybrid vehicle, in which an engine, an electric motor, a hydraulically-operated continuously variable transmission, a first clutch for connecting and disconnecting the engine to and from the motor, and a second clutch for connecting and disconnecting the motor to and from the hydraulically-operated continuously variable transmission are arranged in series to each other, is generally known (see Patent document 1). In the technique disclosed in the Patent document 1, the second clutch is configured to be slip-engaged in addition to complete engagement (complete application) and disengagement (release).

In addition to the configuration as discussed above, a further technique is known. In the further technique (see Patent document 2), a pump is connected to the rotation shaft of a motor, and the pump is driven by the output of the motor, for supplying hydraulic pressure to the continuously variable transmission. In the technique disclosed in the Patent document 2, when a shortage of oil amount in receipt and expenditure occurs in the continuously variable transmission during vehicle deceleration, both of the first clutch and the second clutch are released for the purpose of reducing or coping with the shortage of oil amount in receipt and expenditure, thereby ensuring a return-to-Low performance of the continuously variable transmission during rapid deceleration.

CITATION LIST

Patent Literature

Patent document 1: Japanese Patent Provisional Publication No. JP2008-74226 (A)
Patent document 2: Japanese Patent Provisional Publication No. JP2012-206663 (A)

SUMMARY OF INVENTION

Technical Problem

By the way, in a system configuration that the second clutch, which is interposed between the motor and the hydraulically-operated continuously variable transmission, is configured to be slip-engaged, and the pump is driven by the output of the motor, the second clutch can be brought into slip-engagement in addition to the second clutch release, when a shortage of oil amount in receipt and expenditure occurs in the continuously variable transmission during a vehicle speed decrease. Hence, it is possible to ensure the sufficient amount of oil discharged from the pump by ensuring the rotation speed of the motor.

However, when some kind of abnormality occurs in the second clutch itself or in the second clutch control system and thus the second clutch, which should be brought into slip-engagement, has been brought into an erroneously completely engaged state (erroneous engagement), the motor rotation speed decreases in accordance with the vehicle speed decrease. Accordingly, the discharge amount and discharge pressure of oil, discharged from the pump, also decrease, and thus the oil amount balance in the hydraulically-operated system including the transmission becomes severe.

Owing to the severe oil amount balance, in the case of a belt-type continuously variable transmission a belt slippage occurs. When such a belt slippage starts to develop, the rotation of the motor becomes free by a belt slippage rate, and thus the motor rotation speed begins to increase. Owing to the motor rotation speed increase, the discharge amount and discharge pressure of oil, discharged from the pump, also increase, and thus the shortage of oil amount is eliminated or solved, and then the source pressure can be ensured. As a result, the grip state of the belt recovers, and thus the motor rotation speed begins to decrease again. Accordingly, a shortage (an insufficiency) of the amount of oil discharged from the pump occurs again, and thus a belt slippage occurs again.

In this manner, a belt slip state and a belt grip state are repeated. Repetitions of the belt slip state and the belt grip state cause damage to the continuously variable transmission. Hence, it would be desirable to avoid damage given to apparatus of the continuously variable transmission, such as a belt and pulleys and the like, as much as possible. For this reason, it is necessary to determine whether the clutch is erroneously engaged, and to handle and cope with the erroneous engagement.

In handling and coping with the erroneous engagement, it is required to ensure a vehicle travelling performance, while avoiding the continuously variable transmission from being damaged or reducing damage to the continuously variable transmission.

It is, therefore, in view of the previously-described drawbacks, an object of the present invention to provide an erroneous clutch engagement handling control device capable of ensuring a vehicle travelling performance, while reducing damage to a continuously variable transmission by reducing a load applied to the continuously variable transmission owing to erroneous clutch engagement in a vehicle equipped with the continuously variable transmission connected to an electric motor that drives the vehicle via a clutch and operated using oil pressure from an oil pump driven by the electric motor.

Solution to Problem (1) In order to accomplish the aforementioned and other objects, according to an erroneous clutch engagement handling control device of the present invention, in a vehicle having an electric motor serving as a driving source of the vehicle, a mechanical oil pump drivingly connected to the electric motor, a continuously variable transmission equipped with a hydraulic variator operated using oil pressure from the oil pump and having a primary pulley, a secondary pulley, and an endless power-transmission member wound around these pulleys, a friction engagement clutch interposed between the electric motor and the continuously variable transmission, a clutch control means for controlling the clutch such that the clutch enters into any one clutch control mode of a completely engaged state, a slip-engaged state, and a release state depending on a travelling state of the vehicle, and a vehicle control means for controlling the electric motor such that the electric motor rotates at a target rotation speed based on an output request to the electric motor and the clutch control mode, the erroneous clutch engagement handling control device for performing control to handle erroneous engagement that the clutch is erroneously completely engaged, comprises an erroneous clutch engagement determination unit for determining that the clutch is in an erroneously engaged state when a predetermined determination condition is satisfied, a secondary oil pressure detection means for detecting a secondary oil pressure, which is a pulley hydraulic pressure of the secondary pulley, and an erroneous engagement handling control means for executing torque adjustment control to adjust an output torque of the driving source according to the secondary oil pressure detected by the secondary oil pressure detection means when it is determined that the clutch is in the erroneously engaged state by the erroneous clutch engagement determination unit.

(2) Preferably, the erroneous engagement handling control means executes the torque adjustment control, while limiting at a torque adjustment request lower limit value that maintains a rotation speed of the driving source needed for power transmission.

(3) Preferably, the torque adjustment control is executed to hold the output torque of the driving source when the secondary oil pressure increases, and to decrease the output torque of the driving source according to the secondary oil pressure when the secondary oil pressure decreases.

(4) Preferably, the erroneous engagement handling control means limits a time rate of increase (a speed for torque increase) of the output torque, when an increase request for the output torque of the driving source is present during execution of the torque adjustment control and thus the output torque of the driving source is increasing.

(5) Preferably, the erroneous engagement handling control means gradually increases and recovers the output torque of the driving source at a prescribed time rate of increase, when the torque adjustment control terminates.

(6) Preferably, the erroneous clutch engagement determination unit further comprises a range detection means for detecting a selected range of the continuously variable transmission, a vehicle speed detection means for detecting a vehicle speed of the vehicle, a motor rotation detection means for detecting a rotation speed of the electric motor, a rotation speed difference detection means for detecting an input-and-output rotation speed difference of the clutch, a permission condition determination means for determining, based on information about the clutch control mode selected by the clutch control means and detection information from the range detection means and the vehicle speed detection means, whether a first condition where the clutch control mode is not the completely engaged state, a second condition where the selected range is a travelling range and a third condition where the vehicle speed is less than a predetermined value are all satisfied and for determining that a permission condition is satisfied when the first condition, the second condition, and the third condition are all satisfied, an abnormality temporary determination means for determining, based on detection information from the rotation speed difference detection means when the permission condition has been determined to be satisfied by the permission condition determination means, whether or not an abnormality temporary determination condition, including a first temporary determination condition where there is no input-and-output rotation speed difference of the clutch, is satisfied, and an abnormality confirmation means for determining, based on detection information from the motor rotation detection means when the abnormality temporary determination condition has been determined to be satisfied by the abnormality temporary determination means, whether or not an abnormality confirmation condition where the rotation speed of the electric motor is lower than a preset lower-limit rotation speed is satisfied, and for confirming that the clutch is in the erroneously engaged state when the abnormality confirmation condition is satisfied.

(7) Preferably, the abnormality temporary determination condition further includes a second temporary determination condition where the rotation speed of the electric motor deviates more than a predetermined deviation to a low speed side from the target rotation speed, and the abnormality temporary determination means determines, based on the detection information from the rotation speed difference detection means and the detection information from the motor rotation detection means, whether or not the first temporary determination condition and the second temporary determination condition are satisfied, and for determining that the abnormality temporary determination condition is satisfied when the first temporary determination condition and the second temporary determination condition are both satisfied.

(8) Preferably, the abnormality temporary determination means determines that the abnormality temporary determination condition is satisfied when a state where the first temporary determination condition and the second temporary determination condition are both satisfied has continued for more than a set time period.

Advantageous Effects of Invention

According to the invention, a protection control means executes torque adjustment control to adjust the output torque of an electric motor, when it is determined that the clutch is in an erroneously engaged state where the clutch is erroneously completely engaged. Therefore, it is possible to reduce a load applied to the continuously variable transmission owing to repetitions of a slip and a grip of the endless power-transmission member with respect to the pulleys, caused by erroneous engagement of the clutch. Accordingly, it is possible to protect the continuously variable transmission, while suppressing damage given to the continuously variable transmission due to the above-mentioned load.

BRIEF DESCRIPTION OF DRAWINGS

FIG. 2 is a diagram related to a hydraulic supply system of a vehicle in the embodiment according to the invention, FIG. 2a showing a hydraulic supply system diagram, and FIG. 2b showing an oil pump characteristic diagram.

FIG. 9 is a flowchart illustrating the erroneous clutch engagement determination procedures in the embodiment according to the invention, FIG. 9a showing a main routine, and FIG. 9b showing a subroutine flow.

DESCRIPTION OF EMBODIMENTS

The embodiment of the invention will be hereinafter explained with reference to the drawings. By the way, the embodiment described below is a mere example. It will be understood that the following embodiment is not intended to exclude various changes and modifications and application to various techniques, not explicitly shown and described herein. Respective configurations of the following embodiment may be modified without departing from the scope or spirit of this invention. Also, if necessary, the respective configurations of the embodiment may be suitably sifted and appropriately combined.

In the following discussion, a "rotation speed" means a "rotational frequency", that is, revolutions per unit time, and thus the term "rotation speed" is equivalent to the term "rotational frequency".

Furthermore, in the following discussion, in case of necessity of clear discrimination between a detection value and a target value, the suffix "_r" is added to the character denoting a detection value, whereas the suffix "_t" is added to the character denoting a target value.

[1. Configuration of Powertrain]

Figure 1:
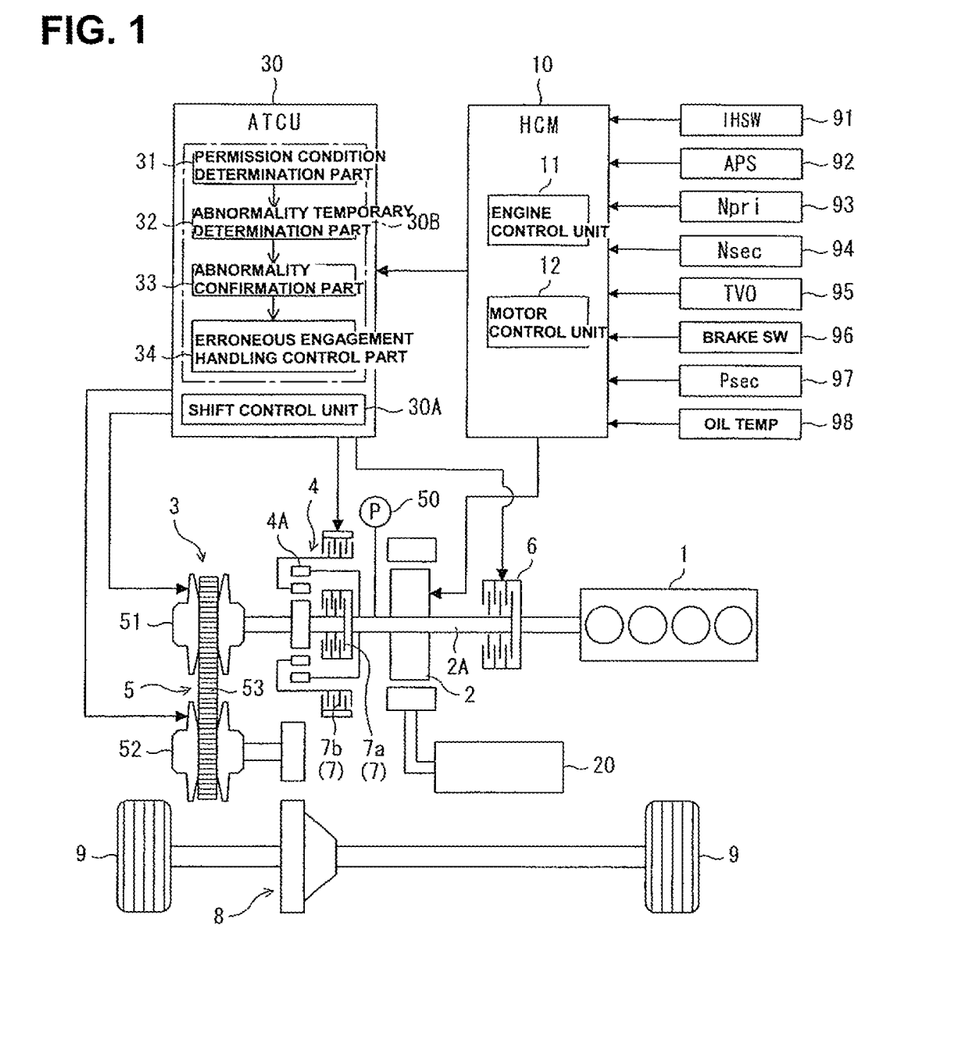
FIG. 1 is a schematic diagram illustrating an erroneous clutch engagement determination unit and an erroneous clutch engagement handling control device in one embodiment according to the invention.

Referring to FIG. 1, there is shown the schematic diagram illustrating a powertrain of an electric vehicle equipped with the continuously variable transmission of the embodiment and its control system. As shown in FIG. 1, the vehicle is constructed as a hybrid vehicle equipped with an engine (an internal combustion engine) 1, a motor generator (an electric motor with a power generation function, hereinafter referred to as simply "MG") 2, a continuously variable transmission (hereinafter referred to as "CVT") 3, serves as an automatic transmission having a forward/reverse changeover mechanism 4 and a variator (a continuously variable transmission mechanism) 5, a first clutch (hereinafter referred to as simply "CL1") 6, a second clutch (hereinafter referred to as simply "CL2") 7, a differential gear 8, and drive road wheels 9, 9.

That is, the hybrid vehicle has the first clutch 6 interposed between the engine 1 and MG2. As a travelling mode, the hybrid vehicle has a HEV mode in which the first clutch 6 is engaged and an EV mode in which the first clutch 6 is disengaged (released). Also, the HEV mode is comprised of an engine only travelling mode in which the vehicle is propelled by using only the engine 1 as a power source and a combined travelling mode in which torque of MG2 is added to torque of engine 1.

Also, the second clutch 7 is interposed between MG2 and the variator 5 of CVT3.

The output shaft of engine 1 and the input side of the rotation shaft 2A of MG2 are connected via the variable torque-capacity first clutch 6. The output side of the rotation shaft 2A of MG2 and the input shaft of continuously variable transmission 3 are connected via the forward/reverse changeover mechanism 4 (i.e., the second clutch 7). The output shaft of CVT3 is connected via the differential gear 8 to drive road wheels 9, 9.

In the HEV mode, the first clutch 6 is engaged, and thus a combined power of the power inputted via the first clutch 6 from the engine 1 and the power inputted from MG2 is inputted via the second clutch 7 into CVT3, and then the input rotation is speed-changed, and thus the speed-changed rotation is outputted from the CVT to the drive road wheels 9, 9.

Also, the rotation shaft of a mechanical oil pump (hereinafter referred to as simply "oil pump" or "mechanical OP") 50 is connected to the rotation shaft 2A of MG2. Oil pump 50 rotates according to rotation of MG2, so as to produce a discharge amount and discharge pressure according to its rotation speed. The pressure of oil discharged from the oil pump is regulated or adjusted to a predetermined pressure through the use of a pressure regulator.

Figure 2A:
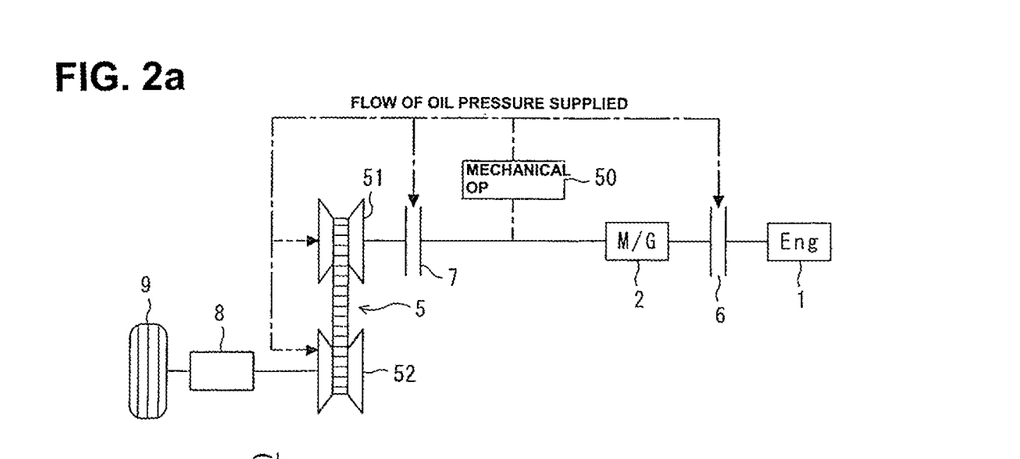

As shown in the hydraulic supply system diagram of FIG. 2a, hydraulic oil (oil pressure) from the oil pump 50 is supplied to respective oil chambers of the first clutch 6, the second clutch 7, and a primary pulley 51 and a secondary pulley of variator 5 (described later).

Figure 2B:
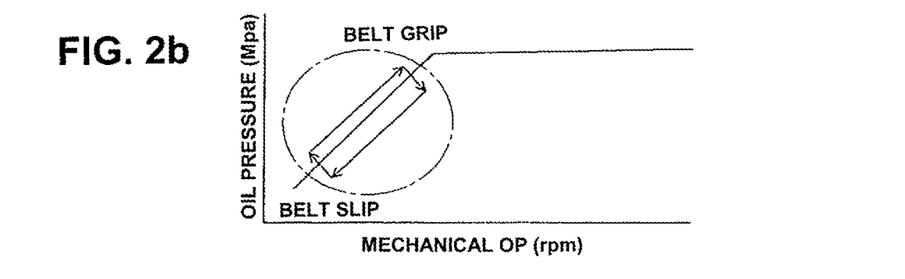

Referring now to FIG. 2b, there is shown the graph illustrating the correlation between the rotational frequency (see the abscissa axis) and oil pressure (see the ordinate axis) of the mechanical oil pump (mechanical OP) 50 driven by MG2. As shown in the graph, the mechanical oil pump has a characteristic such that, as the rotation speed (the rotational frequency) decreases, the discharge oil pressure also decreases in accordance with a decrease in the rotation speed. Therefore, when the rotation speed of MG2 decreases, the rotation speed of oil pump 50 also decreases, and thus the oil pressure decreases. When the oil pressure decrease proceeds, the oil amount balance becomes severe, and thus an insufficiency of the oil pressure occurs. Owing to the insufficient oil pressure, a belt slippage occurs. Owing to the occurrence of such a belt slippage, the load on the MG2 is reduced, and thus rotation of MG2 increases and then rotation of oil pump 50 also increases. Hence, oil pressure discharge from the pump also increases, and thus the belt slippage is suppressed, thereby recovering or increasing a grip of the belt. As a result of this, rotation of oil pump 50 begins to decrease again. In this manner, a belt slip state and a belt grip state are undesirably repeated.

[2. Configuration of Control System of Powertrain]

The control system of the powertrain as discussed above is hereinafter described in detail.

As shown in FIG. 1, the vehicle is provided with an integrated controller (HCM, Hybrid Control Module) 10 serving as a vehicle control means for controlling the entire powertrain and an automatic transmission controller (ATCU, Automatic transmission Control Unit) 30 for controlling CVT3 under control of HCM10. By the way, each of HCM10 and ATCU30 comprises a microcomputer constituted of a central processing unit (CPU), a read only memory (ROM), a random access memory (RAM), and an input-output interface (I/O interface), and the like.

HCM10 has various kinds of control functions for the vehicle, in particular, a function (a functional element, i.e., an engine control unit) 11 that controls the engine 1, a function (a functional element, i.e., a motor control unit) 12 that controls the motor generator 2, for integrally controlling the engine 1 and the motor generator 2. Additionally, HCM10 is configured to output information about commands, related to shifting, for example a target transmission ratio RATIO_t and a target primary rotation speed Npri_t and the like into the ATCU30.

HCM10 is connected to various sensors/switches, such as an inhibitor switch (IHSW) 91 for detecting a shift position of a shift lever (not shown) and for outputting a shift range signal corresponding to the detected shift position, an accelerator position sensor (APS) 92 for detecting an accelerator-pedal operation amount (an accelerator opening) APO, a primary pulley rotation sensor 93 for detecting an actual rotation speed (an actual primary rotation speed) Npri_r of the primary pulley 51 of the variator 5 (described later), a secondary pulley rotation sensor 94 for detecting an actual rotation speed (an actual secondary rotation speed) Nsec_r of the secondary pulley 52 of the variator 5 (described later), a throttle opening sensor 95 for detecting a throttle valve opening (a throttle opening) TVO, a brake switch 96 for detecting the presence or absence of the operation of a brake pedal (not shown), a secondary oil pressure sensor 97 for detecting an actual oil pressure (a secondary oil pressure) Psec_r in the oil chamber of the secondary pulley 52, an oil temperature sensor 98 for detecting an oil temperature of hydraulic oil, and the like. Detection information from these sensors/switches is inputted into the HCM10. In a similar manner, these input informational data are appropriately inputted into the ATCU30.

A target primary rotation speed Npri_t is set within the HCM10, based on information about the accelerator opening APO, a vehicle speed Vsp, a brake signal, and the like. By the way, the vehicle speed Vsp can be calculated or derived from the secondary pulley rotation speed Nsec. Also, HCM10 is configured to set the target primary rotation speed Npri_t such that the target primary rotation speed increases or decreases depending on a downshift request or an upshift request based on a driver's shift-lever operation.

The first clutch 6 is provided to connect and disconnect the engine 1 to and from the motor generator 2. For instance, a wet multiple-disk friction clutch is applied to the first clutch. Engagement and disengagement (release) of the first clutch 6 are controlled by a first clutch oil pressure, which is produced by a hydraulic unit (not shown). This hydraulic unit is controlled by the ATCU30 responsively to a control command corresponding to a travelling mode from HCM10.

HCM10 is configured to determine, based on the vehicle speed Vsp, acceleration and deceleration, the accelerator-pedal operation by the driver, and a state of charge of a battery 20 for driving the vehicle, whether or not a vehicle driving force of engine 1 is required, in order to select a travelling mode and to set respective operating states of the first clutch 6 and the engine 1. When a vehicle driving force of engine 1 is required, the first clutch 6 is brought into engagement such that the vehicle enters into an HEV mode. Conversely when a vehicle driving force of engine 1 is not required, the engine 1 is stopped and at the same time the first clutch 6 is released, such that the vehicle enters into an EV mode.

A forward clutch 7a and a reverse brake 7b, which are both incorporated in the forward/reverse changeover mechanism 4 constructed by a planetary gear 4A, are applied to the second clutch 7. That is to say, during forward travelling, the forward clutch 7a serves as the second clutch 7. Conversely during reverse travelling, the reverse brake 7b serves as the second clutch 7. A wet multiple-disk friction clutch, which is operable in any one of a completely engaged state, a slip-engaged state (a slip state), and a release state, is applied to each of the forward clutch 7a and the reverse brake 7b. The forward clutch 7a and the reverse brake 7b are both controlled by a second clutch oil pressure, which is produced by the hydraulic unit (not shown). Selection of any one clutch control mode of the completely engaged state, the slip-engaged state, and the release state is performed by means of a clutch control part (clutch control means, not shown) of HCM10 depending on a travelling mode.

On the assumption that the vehicle suddenly starts or reaccelerates from low speed, that is, the vehicle starts or accelerates at high-load operation, a third travelling mode (hereinafter referred to as "WSC (Wet Start Clutch) mode") is provided to permit the second clutch 7 to enter into the slip-engaged state. When the WSC mode is selected, HCM10 places the MG2 into a motor rotation speed control mode, and simultaneously places the second clutch 7 into slip-engagement with a transmission torque capacity corresponding to a required driving force.

As discussed above, HCM10 sets the target primary rotation speed Npri_t in a similar manner to usual shift control, and then, in order to bring the actual primary pulley rotation speed Npri_r into the target primary rotation speed Npri_t, HCM10 controls a slip-engaged state between MG2 and the second clutch 7, as follows. First of all, HCM10 sets a target differential rotation $\Delta N_{CL2}\_t$ of the second clutch 7 based on information about the shift range, accelerator opening APO, and vehicle speed Vsp, and then calculates a target rotation (a target motor rotation speed) Nm_t of MG2 based on the target primary rotation speed Npri_t and the target differential rotation $\Delta N_{CL2}\_t$, for controlling the rotation speed of MG2. At the same time, HCM10 calculates an actual differential rotation $\Delta N_{CL2}\_r$ based on the actual primary pulley rotation speed Npri_r and the actual rotation speed Nm_r of MG2, and then, in order to bring the actual differential rotation $\Delta N_{CL2}\_r$ into the target differential rotation $\Delta N_{CL2}\_t$, HCM10 controls the oil pressure supplied to the second clutch 7.

Furthermore, HCM10 performs control according to the target primary rotation speed Npri_t. In particular, in the combined travelling mode in which engine 1 and MG2 are both used, torque distribution of the respective power sources is controlled according to the state of charge of battery 20, the oil temperature, and the brake operational state, as well as accelerator opening APO and vehicle speed Vsp.

[3. CVT and Configuration of Control System Therefor]

CVT3 is provided with the forward/reverse changeover mechanism 4 and variator 5. Variator 5 has the primary pulley 51, the secondary pulley 52, and an endless power-transmission member (hereinafter referred to as simply "belt"), such as a belt or a chain, wound around these pulleys 51, 52.

ATCU30 has a shift control unit 30A and an abnormality monitoring unit 30B as functional elements.

Shift control unit 30A sets an oil pressure of the first clutch 6, an oil pressure of each of the forward clutch 7a and the reverse brake 7b of the forward/reverse changeover mechanism 4, oil pressures (i.e., a primary pulley pressure and a secondary pulley pressure) of the primary pulley 51 and the secondary pulley 52 of variator 5, respectively.

Then, the shift control unit is configured to produce the respective set oil pressures by controlling electromagnetic valve solenoids (i.e., a primary solenoid related to the primary pulley pressure and a secondary solenoid related to the secondary pulley pressure) incorporated in the hydraulic unit, for oil-pressure supply.

Shift control unit 30A is provided with a clutch control part (clutch control means) for controlling the second clutch (the forward clutch 7a, the reverse brake 7b). The clutch control part of shift control unit 30A operates in cooperation with the clutch control part of HCM10. When any one clutch control mode of the completely engaged state, the slip-engaged state, and the release state is selected by means of the clutch control part of HCM10 depending on a travelling mode, the clutch control part of shift control unit 30A controls an engagement state of the second clutch 7 in accordance with the selected clutch control mode. Also, during a transition of switching between a completely engaged state (a complete application state) and a completely disengaged state (a complete release state), the clutch control part of the shift control unit utilizes slip-engagement, so as to perform smooth switching between the completely engaged state and the completely disengaged state, while allowing a plurality of friction disks to slip into and out of engagement. Also, when the WSC mode is selected, HCM10 places the MG2 into a motor rotation speed control mode. At the same time, the shift control unit 30A responds to a command from the HCM10, such that the second clutch 7 is slip-engagement-controlled in order to attain the target differential rotation $\Delta N_{CL2\_t}$ of the second clutch.

Also, regarding the primary pulley pressure and the secondary pulley pressure, shift control unit 30A sets a target transmission ratio (a target pulley ratio) RATIO_t of variator 5, and then controls the primary pulley pressure and the secondary pulley pressure so as to achieve the target transmission ratio without any occurrence of a belt slippage. At this time, the target transmission ratio RATIO_t is set such that the target primary rotation speed Npri_t inputted from HCM10 can be achieved.

In order to detect a state where some kind of abnormality occurs in the second clutch 7 itself or in the control system of the second clutch 7 and thus the second clutch 7, which should be brought into slip-engagement, has been brought into an erroneously completely engaged state (erroneous engagement), abnormality monitoring unit 30B monitors the differential-rotation state between an input and an output of the second clutch 7, the actual rotation speed Nm_r of MG2, the divergence state where the actual rotation speed Nm_r of MG2 deviates to a low speed side with respect to the target rotation speed Nm_t of MG2, and a speed decreasing state of the actual rotation speed Nm_r of MG2, for determining an erroneous engagement abnormality.

Prior to executing the above-mentioned abnormality determination processing, abnormality monitoring unit 30B determines whether or not a preset permission condition is satisfied, and then initiates the abnormality determination processing when the preset permission condition is satisfied. Also, in determining the above-mentioned erroneous engagement abnormality, a first check is made to determine whether or not an abnormality temporary determination condition is satisfied, and then a second check is made to determine whether or not an abnormality confirmation condition is satisfied when the abnormality temporary determination condition is satisfied. In this manner, the abnormality determination processing is performed through a two-stage check.

Furthermore, when it is determined that the erroneous engagement abnormality is present, abnormality monitoring unit 30B performs control to handle or cope with this erroneous engagement abnormality.

Figure 3:
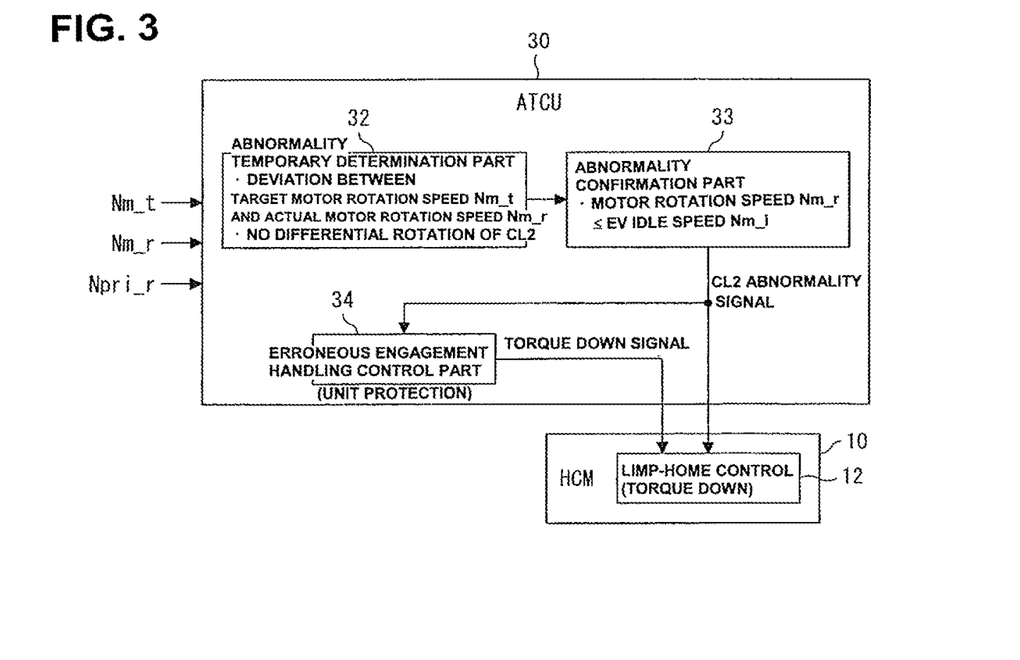
FIG. 3 is block diagram illustrating a control system for the erroneous clutch engagement determination unit and the erroneous clutch engagement handling control device in the embodiment according to the invention.

Hence, as shown in FIGS. 1 and 3, as functional elements, abnormality monitoring unit 30B is provided with a permission condition determination part (permission condition determination means) 31, an abnormality temporary determination part (abnormality temporary determination means) 32, an abnormality confirmation part (abnormality confirmation means) 33, and an erroneous engagement handling control part (erroneous engagement handling control means) 34.

[Determination of Erroneous Engagement Abnormality]

A permission condition, based on which a determination of the permission condition determination part 31 is made, is hereinafter explained.

The permission condition corresponds to a prerequisite for the occurrence of a situation where the second clutch 7 is erroneously engaged and thus the oil amount balance becomes severe. As the permission condition, the following conditions (a) to (e) are provided. The permission condition is determined to be satisfied, when these conditions (a)-(e) are all satisfied.

(a) a condition where a travelling range is selected;

(b) a condition where the time elapsed from switching of the clutch control mode of the second clutch 7 from a completely engaged state to either a slip-engaged state or a release state reaches a predetermined time;

(c) a condition where the clutch control mode has not yet entered the completely engaged state;

(d) a condition where the vehicle speed is less than a predetermined vehicle speed; and (e) a condition where the oil temperature of hydraulic oil is higher than a prescribed temperature.

However, when at least one abnormality of apparatus for determining an erroneous engagement abnormality, such as, an abnormality (a failure) of IHSW91, abnormal rotation (malrotation) of MG2, an abnormality (a failure) of primary pulley rotation sensor 93, an abnormality (a failure) of secondary pulley rotation sensor 94, an abnormality (a failure) of oil temperature sensor 98, an electrical abnormality of the hydraulic pressure control solenoid of the second clutch 7, data communication abnormality and the like, occurs, the erroneous engagement abnormality determination processing is inhibited.

The condition (a) can be determined based on the shift range signal outputted from IHSW91. When the shift range signal is a range other than a P (parking) or an N (neutral) range (for example a D (drive) or an R (reverse) range), the condition (a) is satisfied.

The conditions (b) and (c) can be acquired or determined based on instruction information from HCM10. The condition "the elapsed time reaches the predetermined time" included in the condition (b) is provided, taking account of a response delay of the second clutch 7 in a transition to either a slip-engaged state or a release state from the time when switching of the clutch control mode from the completely engaged state to either the slip-engaged state or the release state occurs. A state, where there are not any abnormalities and the conditions (b) and (c) are met, means that the second clutch 7 is in the slip-engaged state or in the release state.

The condition (d) means that the vehicle is in a low-speed travelling state in which the vehicle enters into the WSC mode.

The condition (e) is provided to exclude a situation where the oil temperature of hydraulic oil is low, for instance immediately after the vehicle has started.

Abnormality temporary determination part 32 determines whether or not an abnormality temporary determination condition is satisfied, when the permission condition has been satisfied. As the abnormality temporary determination condition, the following conditions, namely, a first temporary determination condition [a condition (1) described hereunder] and a second temporary determination condition [a condition (2) described hereunder] are provided. When a state where these two temporary determination conditions are both satisfied has continued for more than a set time period, the abnormality temporary determination condition is determined to be satisfied. By the way, the set time period is a minute time to eliminate the influence of the reading accuracy of the sensor.

(1) a condition where there is no differential rotation (no input-and-output rotation speed difference) between the rotation speed (i.e., motor rotation speed $Nm\_r$) of the input side and the rotation speed (i.e., primary pulley rotation speed $Npri\_r$) of the output side of the second clutch 7; and (2) a condition where the actual rotation speed $Nm\_r$ of MG2 deviates more than a predetermined deviation to a low speed side from the target rotation speed $Nm\_t$.

Abnormality confirmation part 33 determines whether or not an abnormality confirmation condition is satisfied under a situation where the abnormality temporary determination condition has been satisfied.

As the abnormality confirmation condition, the following conditions (3), (4) are provided.

(3) a condition where the actual rotation speed $Nm\_r$ of MG2 is lower than a preset lower-limit rotation speed (an EV idle speed); and (4) a condition where there is no differential rotation (no input-and-output rotation speed difference) between the rotation speed (i.e., motor rotation speed $Nm\_r$) of the input side and the rotation speed (i.e., primary pulley rotation speed $Npri\_r$) of the output side of the second clutch 7.

Hereupon, the above-mentioned conditions (1)-(4) are explained in detail with reference to FIGS. 4-5.

Figure 4:
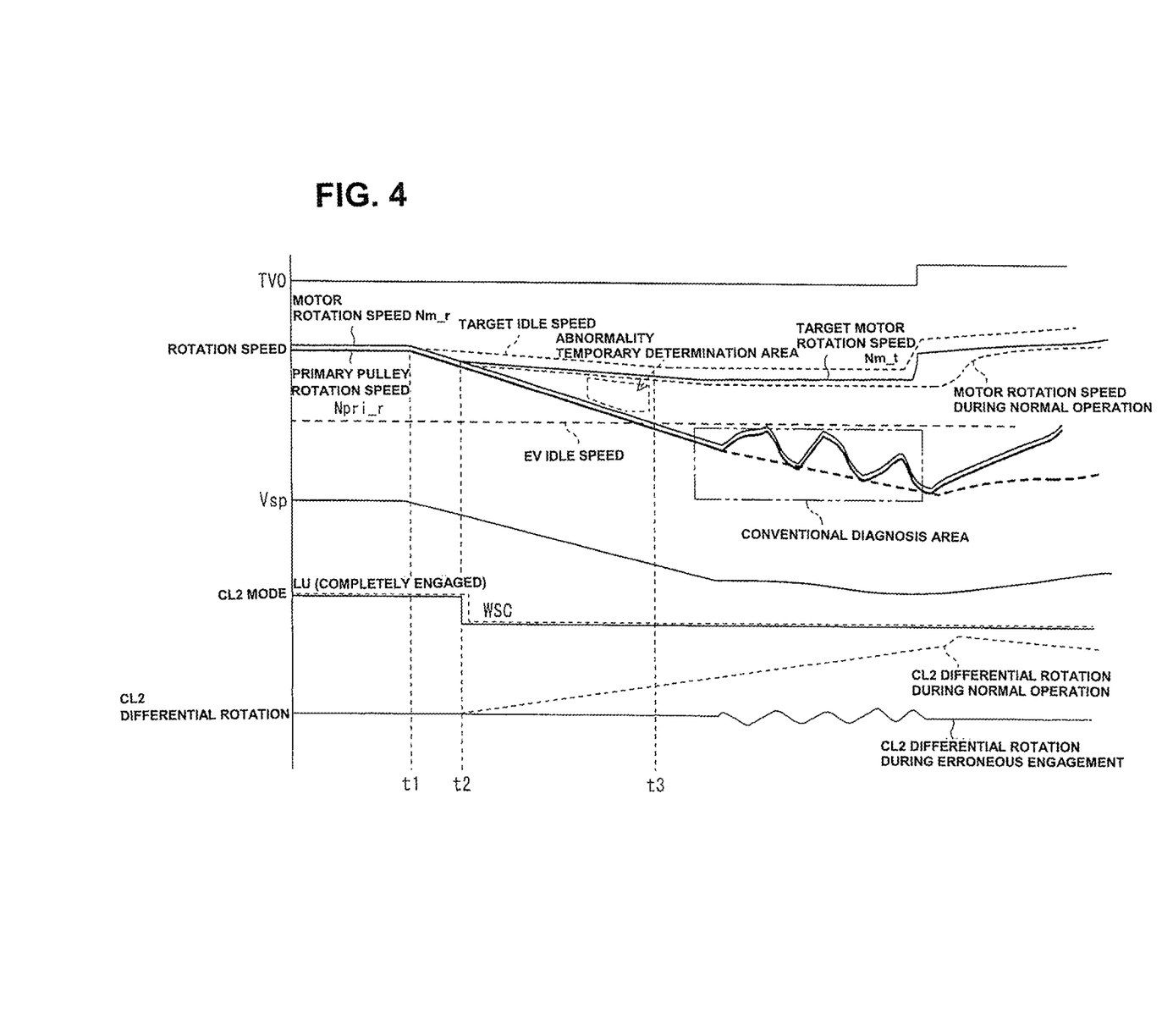
FIG. 4 is a time chart illustrating erroneous clutch engagement determination in the embodiment according to the invention.

As illustrated in FIG. 4, assume that the vehicle travels in an accelerator-OFF state with the second clutch 7 kept in its completely engaged (completely applied) state in an HEV travelling mode, and thus the vehicle speed begins to decrease (see the time t1). Owing to this, the rotation speed of MG2 also begins to decrease. Thus, at the time t2, HCM10 switches the clutch control mode (CL2 mode) of the second clutch 7 from a completely engaged mode to a slip-engagement (WSC) mode, so as to execute control to avoid a rotation speed decrease of MG2. By the way, in FIG. 4, a state of the CL2 mode instruction is indicated by the solid line, while the actual state of CL2 (during normal operation) according to the CL2 mode instruction is indicated by the chain line.

At the same time when HCM10 switches the second clutch 7 to a slip-engagement mode, HCM10 controls rotation (rotation speed) of MG2. In this motor rotation control, HCM10 controls rotation (rotation speed) of MG2, while giving the target motor rotation speed $Nm\_t$ determined based on a target idle speed. By the way, as the target idle speed (that is, an HEV idle speed), a speed value higher than or equal to an EV idle speed (a lower-limit rotation speed) corresponding to a minimum rotation speed during an EV travelling mode is set or used.

When the second clutch 7 is placed appropriately in a slip-engagement state, the rotation speed $Npri\_r$ of the primary pulley 51 follows the vehicle speed, whereas the rotation speed $Nm\_r$ of MG2 follows the target motor rotation speed $Nm\_t$ as indicated by the chain line. Therefore, a differential rotation (an input-and-output rotation speed difference) between the rotation speed (i.e., motor rotation speed $Nm\_r$) of the input side and the rotation speed (i.e., primary pulley rotation speed $Npri\_r$) of the output side of the second clutch 7 occurs.

In contrast, assuming that the second clutch 7 is placed in a completely engaged (completely applied) state, as indicated by the solid line, the rotation speed of MG2 follows the rotation speed of the primary pulley 51, and thus no differential rotation (no input-and-output rotation speed difference) of the second clutch 7 occur. Therefore, the condition (1) becomes satisfied. Additionally, the actual motor rotation speed $Nm\_r$ deviates to a low speed side from the target motor rotation speed $Nm\_t$. As the vehicle speed decreases, the divergence (the deviation) gradually increases, and thus the condition (2) becomes satisfied. Thereafter, at the time t3 when the actual rotation speed $Nm\_r$ of MG2 reduces to below the lower-limit rotation speed (the EV idle speed) owing to a decrease of the vehicle speed, the condition (3) becomes satisfied. Also, the condition (4) becomes satisfied, since the condition (1) has been satisfied.

Accordingly, by virtue of appropriate setting of the "predetermined deviation" of the condition (2), first, the conditions (1), (2) become both satisfied, and thus the abnormality temporary determination condition becomes satisfied. When this state has continued, the abnormality confirmation condition including the conditions (3), (4) becomes satisfied. Since the conditions (1), (2) have already been both satisfied, there is no need for confirming the continuation of the condition (3) based on a count value to be counted by a timer. At the time when the condition (3) has been satisfied, that is, the actual rotation speed $Nm\_r$ of MG2 has reduced to below the lower-limit rotation speed (the EV idle speed), it is possible to conform an erroneous engagement abnormality of the second clutch 7.

Figure 5:
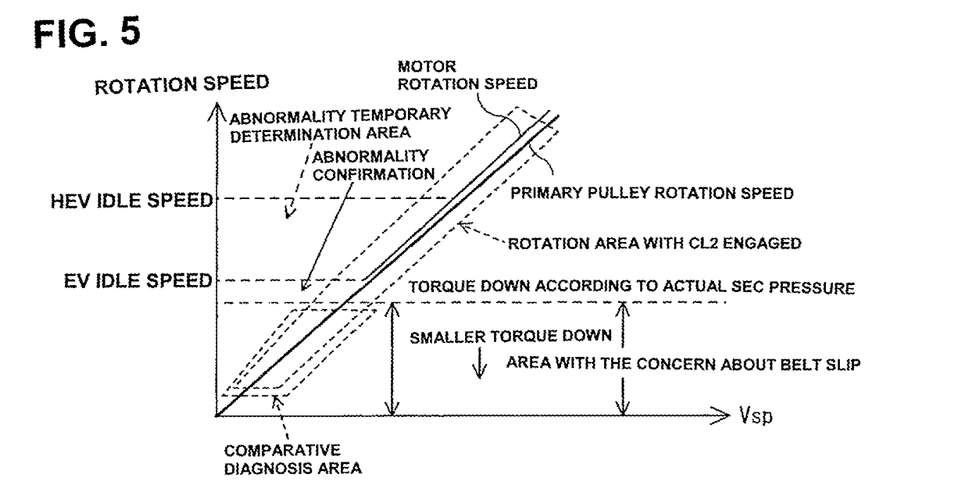
FIG. 5 is a graph illustrating a determination area for the erroneous clutch engagement determination in the embodiment according to the invention, the determination area being specified by an input-side rotation speed (a motor rotation speed) and an output-side rotation speed (a vehicle speed) of a second clutch.

Referring to FIG. 5, there is shown the graph illustrating a determination area for the erroneous clutch engagement determination. When the erroneous engagement abnormality of the second clutch 7 is present, rotation of MG2 follows rotation of the primary pulley 51, and also decreases according to a decrease of vehicle speed Vsp. Under a situation where the rotation speed of MG2 is within an abnormality temporary determination area, a check is made to determine whether the abnormality temporary determination condition including the conditions (1), (2) is satisfied. At the time when the actual rotation speed $Nm\_r$ of MG2 has reduced to below the lower-limit rotation speed (the EV idle speed), it is possible to quickly confirm the erroneous engagement abnormality of the second clutch 7.

On the contrary, as described in connection with the "Technical Problem", in the case of a conventional method in which an erroneous engagement abnormality is determined to be present when the rotation speed of MG2 becomes lower than a preset lower limit speed value and also a state where there is no differential rotation between an input and an output of the second clutch 7 has continued for a given time period, as indicated as a comparative diagnosis area in FIG. 5, it is determined that an erroneous engagement abnormality is present after the motor rotation speed has deeply entered into an area with the concern about a belt slip. Hence, there is an increased tendency for the variator 5 to be damaged.

Erroneous engagement handling control part 34 executes torque adjustment control (in the shown embodiment, torque down control in which torque is decreased) to adjust an output torque of the driving source (corresponding to an input torque to CVT3) according to the secondary oil pressure Psec_r detected by the secondary oil pressure sensor 97, after a confirmation on an erroneous engagement abnormality has been made by means of the abnormality confirmation part 33. In the shown embodiment, the driving source corresponds to the engine 1 and MG2. The driving source varies depending on a selected travelling mode. For instance, in an HEV mode, the engine 1 and MG2 serve as the driving source. In an EV mode, MG2 serves as the driving source. For the purpose of simplification of the disclosure, a case where MG2 serves as the driving source is exemplified.

[Torque Down Control for Erroneous Engagement Handling Control]

In the shown embodiment, torque down control is executed after an abnormality confirmation has been made by means of the abnormality confirmation part 33, but a permission condition is also set for the torque down control itself.

As the permission condition for torque down control, the following conditions (a'), (b') are provided. When these conditions (a'), (b') are both satisfied, the permission condition is determined to be satisfied.

(a') a condition where a travelling range is selected; and (b') a condition where a state, defined by an inequality of target motor rotation speed Nm_t>a predetermined value (in the shown embodiment, EV idle speed), has continued for a predetermined time (the predetermined time being set to a response time of MG2).

However, when at least one abnormality of apparatus for determining an erroneous engagement abnormality, such as, an abnormality (a failure) of IHSW91, abnormal rotation (malrotation) of MG2, an abnormality (a failure) of primary pulley rotation sensor 93, an abnormality (a failure) of secondary pulley rotation sensor 94, an abnormality (a failure) of throttle opening sensor 95, an abnormality (a failure) of secondary oil pressure sensor 97, an electrical abnormality of the hydraulic pressure control solenoid of the second clutch 7, data communication abnormality and the like, occurs, the torque down control is inhibited.

When the following torque down condition (1') becomes satisfied under a situation where the permission condition has been satisfied, torque down control is initiated.

(1') a condition where a state, defined by an inequality of motor rotation speed Nm_r<a predetermined value (in the shown embodiment, EV idle speed), has continued for a predetermined count period (the predetermined count period being set to a minute time to eliminate the influence of the reading accuracy of the sensor).

By the way, when, after having initiated the torque down control, the torque down condition (1') becomes unsatisfied, when the permission condition for torque down control becomes unsatisfied, or when an increase request for the output torque of MG2 is present and a state where the increase request is present has continued for a predetermined count period (the predetermined count period being set to a minute time to eliminate the influence of the reading accuracy of the sensor), the torque down control is cancelled or released.

In the WSC mode in which the second clutch 7 is placed into slip-engagement, as discussed previously, target motor rotation speed Nm_t is set for controlling the rotation speed of MG2. However, when the second clutch 7 enters into an erroneous engagement abnormality, it is impossible to appropriately control the rotation speed of MG2. Hence, torque down control for decreasing the output torque of MG2 in accordance with the secondary oil pressure Psec_r is executed.

Figure 6:
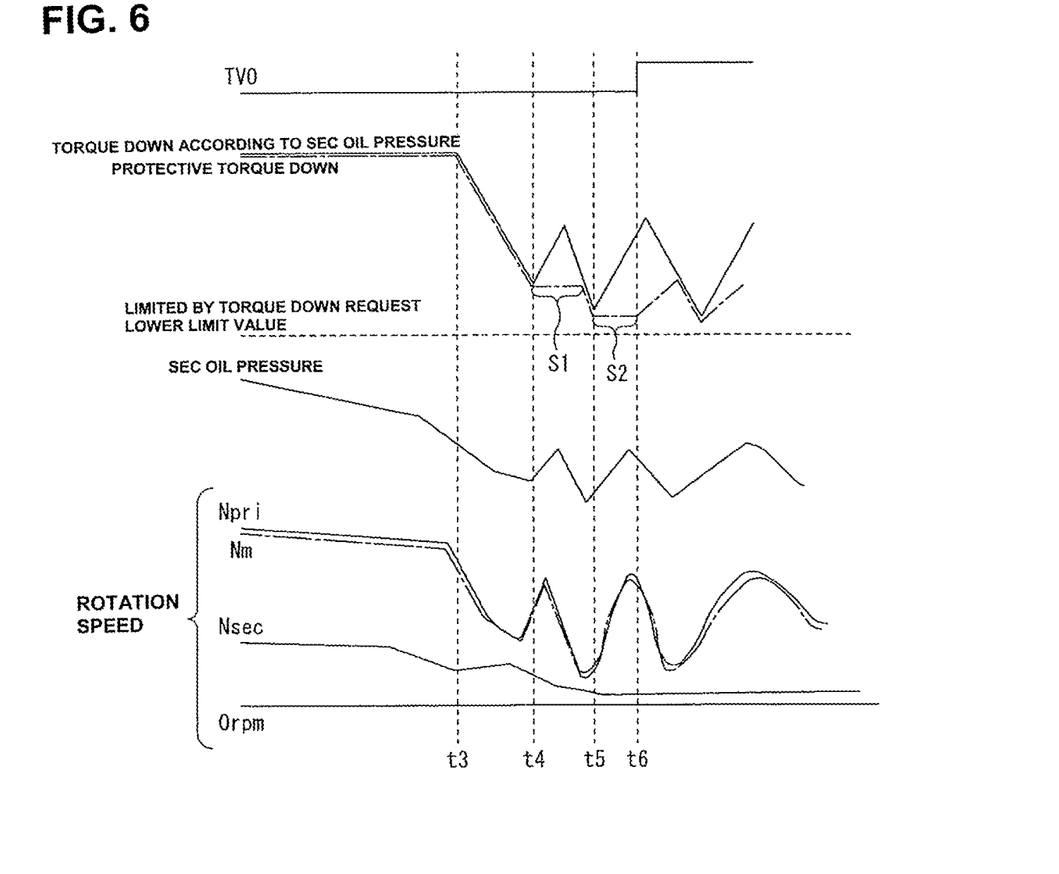
FIG. 6 is a time chart illustrating erroneous clutch engagement handling control in the embodiment according to the invention.

Referring to FIG. 6, there is shown the time chart illustrating torque down control. As indicated by the solid line (TORQUE DOWN ACCORDING TO SEC PRESSURE) in FIG. 6, immediately when an erroneous engagement abnormality has been confirmed at the time t3, torque down control is executed in concert with the secondary oil pressure Psec_r.

That is, when the secondary oil pressure Psec_r decreases, a belt slippage tends to occur, and hence the output torque of MG2, which serves as a driving source is decreased in concert with the secondary oil pressure Psec_r, thereby suppressing an input torque to CVT3 and consequently suppressing the belt slippage (see the time period between the time t3 and the time t4).

On the other hand, when the secondary oil pressure Psec_r recovers and increases, a belt slippage is less likely to occur, and thus the discharge amount and discharge pressure of oil, discharged from the oil pump, can be assured by recovering and increasing the output torque of MG2, which serves as the driving source, in concert with the secondary oil pressure Psec_r and by increasing the rotation speed Nm of MG2. Thereafter, when the secondary oil pressure Psec_r decreases again, the output torque of MG2, which serves as a driving source is decreased again in concert with the secondary oil pressure Psec_r, thereby avoiding the belt slippage (see the time period between the time t4 and the time t5).

However, suppose that the rotation speed Nm of MG2 has decreased considerably by the torque down control. In such a case, the discharge amount and discharge pressure of oil, discharged from the oil pump, tend to decrease undesirably. This leads to a vicious circle such as a deteriorated oil amount balance, in other words, inadequate power transmission. As a result, it becomes difficult to ensure a vehicle travelling performance. Therefore, in the aforementioned torque down control, for the purpose of maintaining a rotation speed of the driving source (MG2) needed for power transmission, a lower limit value (a torque-down request lower limit value serving as a torque-down adjustment lower limit value) is putted on the torque down (the output torque decrease). Hence, even when the secondary oil pressure Psec_r continues to decrease, the output torque decrease is limited to the lower limit value. By the way, a situation, where it is difficult to ensure a vehicle travelling performance, is different depending on a gear ratio of the forward/reverse changeover mechanism 4 (the gear ratio also being different depending on forward travelling or reverse travelling). Thus, the lower limit value is set depending on the gear ratio.

Additionally, in the aforementioned abnormality confirmation state, the rotation speed of MG2 fluctuates up and down in a low speed range, and thus a slip and a grip of belt 53 are repeated, as shown in FIG. 2b. As shown in FIG. 6, the secondary oil pressure Psec_r fluctuates up and down. The up-and-down fluctuations affects operation on a torque-down request (a torque-down request value) based on the secondary oil pressure Psec_r.

Therefore, as appreciated from sections S1, S2, indicated by the dashed line (PROTECTIVE TORQUE DOWN) in FIG. 6, even when the secondary oil pressure Psec_r recovers and rises, it is desirable to control the output torque of the driving source such that the output torque is held or retained without recovery/rise of the output torque by means of the protection control side (a belt-slip avoidance side). As a matter of course, when the secondary oil pressure Psec_r drops to below a protective level, it is desirable to decrease the output torque in concert with a drop in the secondary oil pressure Psec_r. In this way, even when belt 53 fluctuates between a slip state and a grip state, its fluctuation width can be effectively suppressed, thereby suppressing the up-and-down fluctuations of the secondary oil pressure Psec_r. Hence, operation on a torque-down request can be appropriately achieved.

During execution of the aforementioned torque down control, when an increase request for the output torque of MG2, for example a mode transition from an accelerator-ON state to an accelerator-OFF state, is present, the torque down control is cancelled or released, so as to recover (increase) the output torque of MG2. At this time, the increase of the output torque of MG2 is executed, while limiting the time rate of increase to a prescribed time rate of increase (see a "RAMP A" shown in the time chart).

Figure 7:
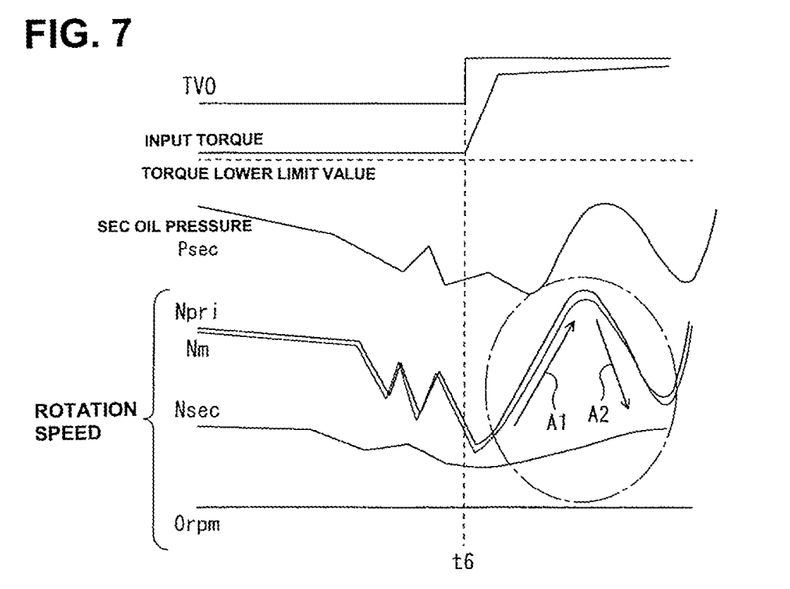
FIG. 7 is a time chart illustrating a situation of control during switching to an accelerator-ON state for the erroneous clutch engagement handling control in the embodiment according to the invention.

Referring to FIG. 7, there is shown the time chart illustrating fluctuations of the secondary oil pressure Psec, motor rotation speed Nm, primary rotation speed Npri, and secondary rotation speed Nsec, when, during execution of torque down control in an accelerator-OFF state, a transition to an accelerator-ON state occurs at the time t6 and then the output torque of MG2 recovers (increases) according to a given time rate of increase based on the accelerator opening.

As shown in FIG. 7, immediately when the output torque of MG2 begins to increase at a given rate of increase based on an increase of the accelerator opening at the time t6 (the accelerator-ON time), the input torque of the continuously variable transmission begins to increase in accordance therewith. At the same time, as indicated by the arrow A1 in FIG. 7, the rotation of MG2 also increases and thus the rotation of the primary pulley 51 increases. On the other hand, the vehicle speed Vsp also increases and thus the rotation of the secondary pulley 52 also increases, following the vehicle speed Vsp, but a rise (an increase) of vehicle speed Vsp is slow in comparison with the rotation speed rise of MG2. As a result, a large slip is generated in the belt. When such a slip of the belt occurs, the torque inputted to CVT3 begins to decrease and thus the slip is suppressed, but the belt becomes reversed from the slip state rapidly to the grip state. Accordingly, the primary pulley is dragged by the vehicle speed Vsp whose speed rise is delayed (in other words, the rotation of the secondary pulley 52, which remains in a low-rotation state), and thus the rotation of the primary pulley 51 and the rotation of MG2 begin to decrease rapidly as indicated by the arrow A2 in FIG. 7. Therefore, heavy damage may be given to the CVT3.

Figure 8:
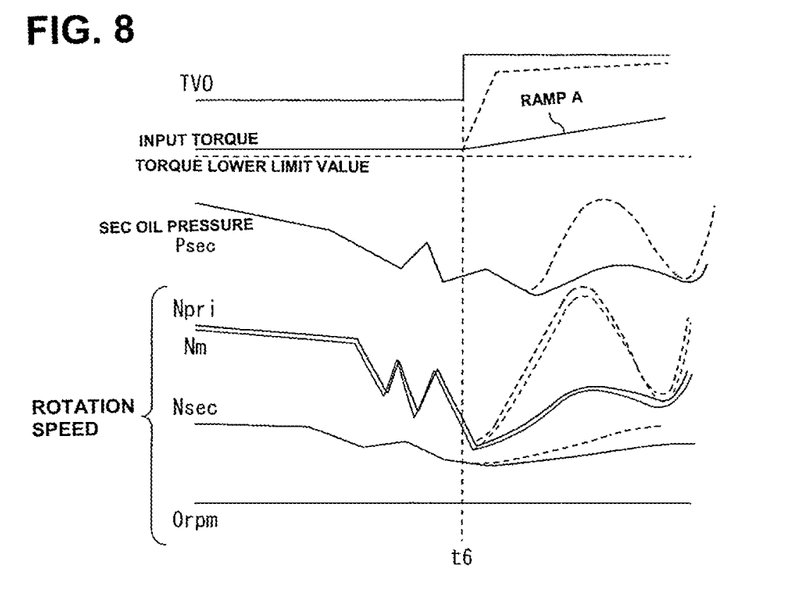
FIG. 8 is a time chart illustrating the erroneous clutch engagement handling control during switching to an accelerator-ON state in the embodiment according to the invention.

In contrast to the above, in the case that, as indicated by the solid line in FIG. 8, the increase of the output torque of MG2 is executed, while limiting a time rate of increase, the secondary oil pressure Psec, motor rotation speed Nm, and primary rotation speed Npri, tend to change gently, thereby avoiding or suppressing the belt from being largely repeatedly slipped and gripped. Thus, it is possible to reduce damage given to CVT3. By the way, the characteristic in which the output torque of MG2 increases at a given time rate of increase based on the accelerator opening (that is, the characteristic shown in FIG. 7) is indicated additionally by the broken line in FIG. 8.

For instance, a situation where the torque down control is cancelled includes a situation where the torque down condition (1') becomes unsatisfied and a situation where the permission condition (a') becomes unsatisfied. Also, in such a situation, the recovery (the increase) of the output torque of MG2 is executed while limiting the time rate of increase to a prescribed time rate of increase. Additionally, when cancelling the torque down control on condition that the torque down condition (1') becomes unsatisfied or the permission condition (a') becomes unsatisfied, the prescribed time rate of increase for limiting torque-increase speed may be changed or altered depending on whether or not the accelerator is in its ON state. For instance, when the accelerator is placed in an ON state, the output torque of MG2 is increased, while limiting the time rate of increase (the torque-increase speed) to a prescribed ramp B. Conversely when the accelerator is not placed in an ON state, the output torque of MG2 is increased, while limiting the time rate of increase (the torque-increase speed) to a prescribed ramp C gentler than the ramp B.

[Operation and Effects]

The erroneous clutch engagement determination unit and the erroneous clutch engagement handling control device of the embodiment of the invention are constructed as discussed above. Hence, as shown in the flowcharts of FIGS. 9-10, an erroneous clutch engagement determination and an erroneous clutch engagement handling control can be executed. The flowcharts of FIGS. 9-10 are initiated when a key switch becomes turned ON, and repeatedly executed at a predetermined control cycle until such time an abnormality confirmation has been made or the key switch has been turned OFF.

Figures 9A, 9B:
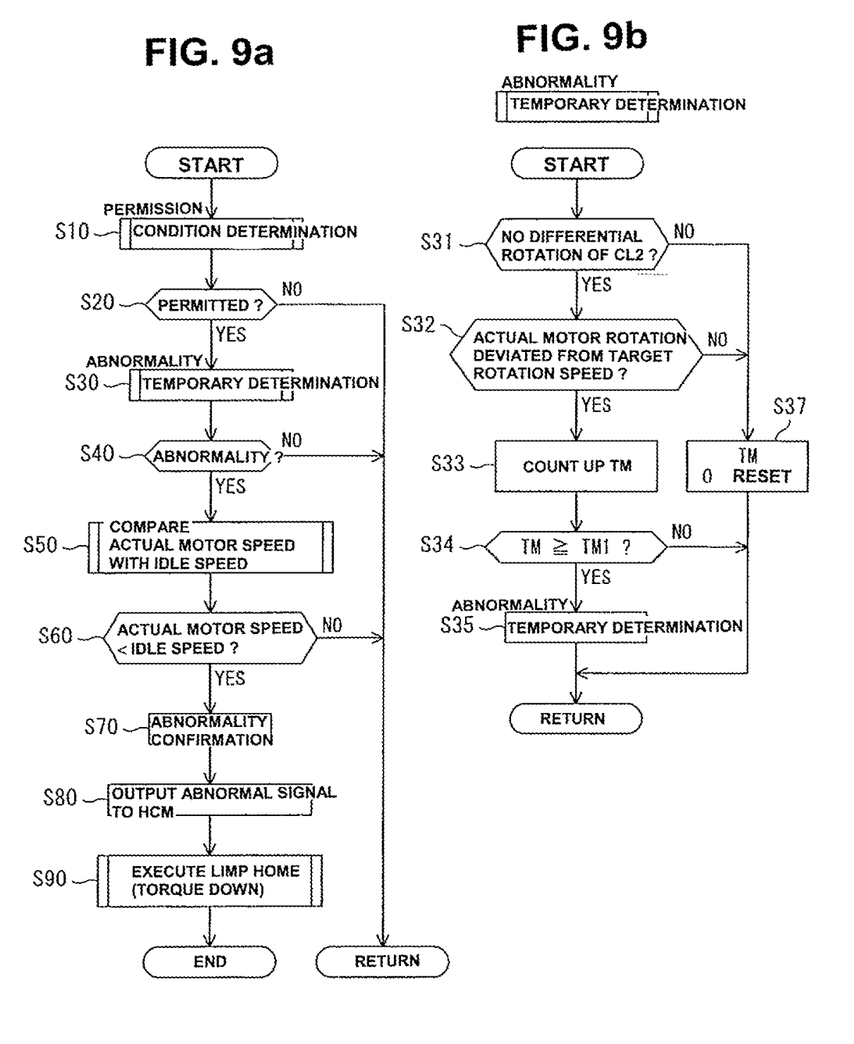
Figure 10:
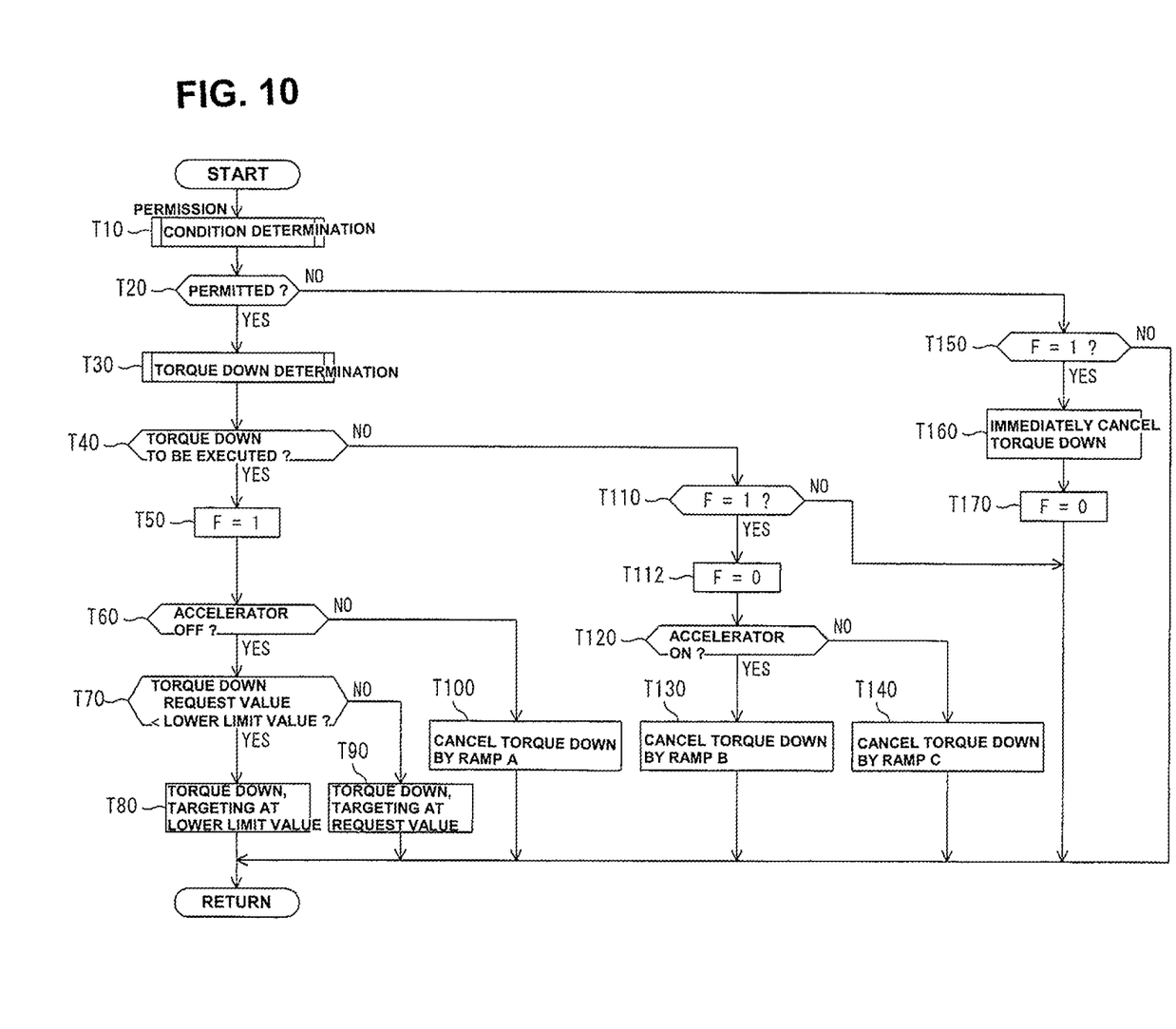
FIG. 10 is a flowchart illustrating the erroneous clutch engagement handling control procedures in the embodiment according to the invention.

In the erroneous clutch engagement determination processing, as shown in FIG. 9a, first of all, the determination processing of the permission condition including the conditions (a)-(e) is executed (step S10). By the way, the determination of the permission condition is initiated after having confirmed that the current situation does not correspond to a situation corresponding to the previously-described inhibition condition. Then, a check is made to determine whether or not the permission condition is satisfied (step S20). When the permission condition is not satisfied, the routine is returned. Conversely when the permission condition is satisfied, the determination processing of the abnormality temporary determination condition for an erroneous engagement abnormality is executed (step S30). The details of the determination processing of the abnormality temporary determination condition will be described later.

Next, a check is made to determine whether or not the abnormality temporary determination condition is satisfied (step S40). When the abnormality temporary determination condition is not satisfied, the routine is returned. Conversely when the abnormality temporary determination condition is satisfied, the determination processing of the abnormality confirmation condition corresponding to only the condition (3) is executed (step S50), since the abnormality confirmation condition corresponding to the condition (4) has already been satisfied. The determination processing of the abnormality confirmation condition is made by determining whether or not the actual rotation speed Nm_r is lower than the EV idle speed, which is the lower-limit rotation speed. When the determination result on whether or not the actual rotation speed Nm_r is lower than the EV idle speed (step S60) is in the negative and thus the abnormality confirmation condition is unsatisfied, the routine is returned. Conversely when the determination result is in the affirmative and thus the abnormality confirmation condition is satisfied, an abnormality confirmation is made (step S70), and thus an abnormal signal is outputted to the HCM10 (step S80), and then a command to execute torque down control, which serves as abnormality handling control, is instructed to the HCM10, and then a limp home control mode is executed (a limp home capability is permitted) (step S90).

The determination processing of the abnormality temporary determination condition is executed as shown in FIG. 9b. The abbreviation "TM" in FIG. 9b means a timer value (counts of a timer). The timer counts a time or a time period during which the conditions (1), (2) are both satisfied, as the timer value "TM".

In the determination processing of the abnormality temporary determination condition, first of all, a check is made to determine whether the condition (1) is satisfied, that is, there is no differential rotation (no input-and-output rotation speed difference) between the input side and the output side of the second clutch 7 (step S31). When there is a differential rotation between the input side and the output side of the second clutch 7, the timer value TM is reset to "0" (step S37), and the routine is returned. Conversely when there is no differential rotation between the input side and the output side of the second clutch 7, a check is made to determine whether the condition (2) is satisfied, that is, the actual rotation speed Nm_r of MG2 deviates more than a predetermined deviation to a low speed side from the target rotation speed Nm_t (step S32). When the actual rotation speed Nm_r of MG2 does not deviate more than a predetermined deviation to a low speed side from the target rotation speed Nm_t, the timer value TM is reset to "0" (step S37), and the routine is returned. Conversely when the actual rotation speed Nm_r of MG2 deviates more than a predetermined deviation to a low speed side from the target rotation speed Nm_t, the timer value TM is incremented or counted up (step S33).

Thereafter, a check is made to determine whether the timer value TM reaches a predetermined value TM1 (a predetermined count period) (step S34). When the timer value TM does not reach the predetermined value TM1, the routine is returned. Conversely when the timer value TM reaches the predetermined value TM1, the conditions (1), (2) are determined to be both met continuously for the predetermined count period, and thus an abnormality temporary determination is made, that is, the presence of an erroneous engagement abnormality is temporarily determined (step S35).

The erroneous engagement handling control is executed as shown in FIG. 10. The abbreviation "F" in FIG. 10 means a control flag. The flag "F" is set to "1" during execution of torque down control, and otherwise reset to "0".

As shown in FIG. 10, first of all, the determination processing of the permission condition including the conditions (a'), (b') is executed (step T10). By the way, the determination of the permission condition is initiated after having confirmed that the current situation does not correspond to a situation corresponding to the previously-described inhibition condition.

The, a check is made to determine whether or not the permission condition is satisfied (step T20). When the permission condition is not satisfied, a check is made to determine whether or not the flag "F" is "1", that is, the system is placed in the torque down control at the current control cycle (step T150). When the flag "F" is not set to "1", the routine is returned. Conversely when the flag "F" is "1", the torque down control, which is executed currently, is immediately cancelled (step T160). This wording "immediate cancellation" means that the increase of the output torque of MG2 is immediately executed without limiting a time rate of increase. Thereafter, the flag "F" is reset to "0" (step T170), and then the routine is returned.

In contrast to the above, when the permission condition is satisfied, torque down determination processing having the condition (1') is made. That is, a check is made to determine whether a state where the motor rotation speed Nm_r is less than a predetermined value (EV idle speed) has continued for a predetermined count period (step T30).

Then, a check is made to determine, based on the result of the torque down determination processing, whether or not the torque down (torque down control) should be executed (step T40). When it is determined that the torque down should be executed, the flag "F" is set to "1" (step T50). Then, a check is made to determine whether or not the accelerator is placed in the OFF state (step T60). When the accelerator is placed in the OFF state, a check is made to determine whether a torque-down request value is less than a lower limit value (step T70). When the torque-down request value is less than the lower limit value, the torque down (torque down control) is executed, targeting at the lower limit value (step T80). Conversely when the torque-down request value is not less than the lower limit value, the torque down (torque down control) is executed, targeting at the torque-down request value (step T90).

On the other hand, when step T60 determines that the accelerator is placed in the ON state, the torque down control is cancelled, and then the increase of the output torque of MG2 is executed while limiting the time rate of increase to a prescribed time rate of increase (ramp A) (step T100).

In contrast, when step T40 determines that the torque down should not be executed, a check is made to determine whether or not the flag "F" is "1", that is, the system is placed in the torque down control at the current control cycle (step T110). When the flag "F" is not set to "1" and thus the system is not placed in the torque down control at the current control cycle, the routine is returned. Conversely when the flag "F" is "1" and thus the system is placed in the torque down control at the current control cycle, the flag "F" is reset to "0" (step T112), and then a check is made to determine whether or not the accelerator is placed in the ON state (step T120).

When it is determined that the accelerator is placed in the ON state, the torque down control is cancelled, and then the increase of the output torque of MG2 is executed while limiting the time rate of increase to a prescribed time rate of increase (ramp B) (step T130). Conversely when it is determined that the accelerator is placed in the OFF state, the torque down control is cancelled, and then the increase of the output torque of MG2 is executed while limiting the time rate of increase to a prescribed time rate of increase (ramp (gradient) C gentler than ramp (gradient) B) (step T140).

Therefore, according to the erroneous clutch engagement determination unit, first, on the basis of the abnormality temporary determination conditions (1), (2) suitable for abnormality determination immediately after the occurrence of an erroneous engagement abnormality, an abnormality is temporarily determined. Hereby, after an abnormality has been temporarily determined, although there is a time lag from the occurrence of an erroneous engagement abnormality to the time when the abnormality determination processing is initiated, the erroneous engagement abnormality is confirmed on the basis of the abnormality confirmation condition (3), upon which the abnormality to be handled can be certainly determined, under a situation where the abnormality confirmation condition (4), which is identical to the abnormality temporary determination condition (1), has been satisfied. In particular, the time (the set time period) for an abnormality confirmation based on the abnormality confirmation condition (3) can be preset as a time period merely required to ensure the reliability of a detection value. Hence, it is possible to shorten the time period from the occurrence of an abnormality to an abnormality confirmation.

That is, assuming that a confirmation on an erroneous engagement abnormality is made based on only the condition (3), a certain length of confirmation time or more is required.

In contrast, in the case of the device of the invention, there is no need for such a confirmation time. Hence, immediately when a situation of the condition (3) occurs, that is, the condition (3) becomes met, the abnormality can be quickly confirmed.

Furthermore, when the erroneous engagement abnormality has occurred, it is possible to ensure a vehicle travelling performance (to ensure or realize a limp-home function), while protecting the variator 5 by erroneous engagement handling control executed by the erroneous clutch engagement handling control device, that is, torque down control.

[5. Others]

While the foregoing is a description of the preferred embodiments carried out the invention, it will be understood that the invention is not limited to the particular embodiments shown and described herein, but that various changes and modifications may be made without departing from the scope or spirit of this invention.

In the shown embodiment, for instance when the conditions (1), (2), included in the abnormality temporary determination condition, are both satisfied, the abnormality temporary determination condition is determined to be satisfied, for the purpose of more certainly making an abnormality temporary determination. In lieu thereof, the determination processing may be set such that, when only the condition (1) is satisfied, the abnormality temporary determination condition is determined to be satisfied.

In the shown embodiment, execution of erroneous clutch engagement handling control, which is performed by the erroneous clutch engagement handling control device, and execution of determination processing which is performed by the erroneous clutch engagement determination unit of the embodiment are linked together. It will be understood that the method for determining an erroneous clutch engagement, linked with the erroneous clutch engagement handling control which is performed by the erroneous clutch engagement handling control device according to the invention, is not limited to the determination method of the erroneous clutch engagement determination unit of the embodiment. In lieu thereof, an erroneous clutch engagement may be determined by the use of another method, so as to execute the erroneous clutch engagement handling control when the erroneous clutch engagement is determined to be present by the use of the another method. In this case, as various conditions related to erroneous clutch engagement handling control, that is, a permission condition, an inhibition condition, a torque down condition, and a condition based on which torque down control is cancelled, the previously-discussed conditions can be used.

In the shown embodiment, a hybrid vehicle is exemplified as a vehicle, but the inventive concept may be applied to any vehicle, in which an electric motor serves as a driving power source, for example, an electric vehicle, in which only the electric motor is a driving power source.

The invention claimed is:

1. In a vehicle having an electric motor serving as a driving source of the vehicle, a mechanical oil pump drivingly connected to the electric motor, a continuously variable transmission equipped with a hydraulic variator operated using oil pressure from the oil pump and having a primary pulley, a secondary pulley, and an endless power-transmission member wound around these pulleys, a friction engagement clutch interposed between the electric motor and the continuously variable transmission, a clutch control means for controlling the clutch such that the clutch enters into any one clutch control mode of a completely engaged state, a slip-engaged state, and a release state depending on a travelling state of the vehicle, and a vehicle control means for controlling the electric motor such that the electric motor rotates at a target rotation speed based on an output request to the electric motor and the clutch control mode, an erroneous clutch engagement handling control device for performing control to handle erroneous engagement that the clutch is erroneously completely engaged, comprising:
   an erroneous clutch engagement determination unit for determining that the clutch is in an erroneously engaged state when a predetermined determination condition is satisfied;
   a secondary oil pressure detection means for detecting a secondary oil pressure, which is a pulley hydraulic pressure of the secondary pulley; and
   an erroneous engagement handling control means for executing torque adjustment control to adjust an output torque of the driving source according to the secondary oil pressure detected by the secondary oil pressure detection means when it is determined that the clutch is in the erroneously engaged state by the erroneous clutch engagement determination unit.

2. The erroneous clutch engagement handling control device as recited in claim 1, wherein:
   the erroneous engagement handling control means executes the torque adjustment control, while limiting at a torque adjustment request lower limit value that maintains a rotation speed of the driving source needed for power-transmission.

3. The erroneous clutch engagement handling control device as recited in claim 1, wherein:
   the torque adjustment control is executed to hold the output torque of the driving source when the secondary oil pressure increases, and to decrease the output torque of the driving source according to the secondary oil pressure when the secondary oil pressure decreases.

4. The erroneous clutch engagement handling control device as recited in claim 1, wherein:
   the erroneous engagement handling control means limits a time rate of increase of the output torque, when an increase request for the output torque of the driving source is present during execution of the torque adjustment control and thus the output torque of the driving source is increasing.

5. The erroneous clutch engagement handling control device as recited in claim 1, wherein:
   the erroneous engagement handling control means gradually increases and recovers the output torque of the driving source at a prescribed time rate of increase, when the torque adjustment control terminates.

6. The erroneous clutch engagement handling control device as recited in claim 1, wherein:
   the erroneous clutch engagement determination unit further comprises a range detection means for detecting a selected range of the continuously variable transmission, a vehicle speed detection means for detecting a vehicle speed of the vehicle, a motor rotation detection means for detecting a rotation speed of the electric motor, a rotation speed difference detection means for detecting an input-and-output rotation speed difference of the clutch, a permission condition determination means for determining, based on information about the clutch control mode selected by the clutch control means and detection information from the range detection means and the vehicle speed detection means, whether a first condition where the clutch control mode is not the completely engaged state, a second condition where the selected range is a travelling range and a third condition where the vehicle speed is less than a predetermined value are all satisfied and for determining that a permission condition is satisfied when the first condition, the second condition, and the third condition are all satisfied, an abnormality temporary determination means for determining, based on detection information from the rotation speed difference detection means when the permission condition has been determined to be satisfied by the permission condition determination means, whether or not an abnormality temporary determination condition, including a first temporary determination condition where there is no input-and-output rotation speed difference of the clutch, is satisfied, and an abnormality confirmation means for determining, based on detection information from the motor rotation detection means when the abnormality temporary determination condition has been determined to be satisfied by the abnormality temporary determination means, whether or not an abnormality confirmation condition where the rotation speed of the electric motor is lower than a preset lower-limit rotation speed is satisfied, and for confirming that the clutch is in the erroneously engaged state when the abnormality confirmation condition is satisfied.

7. The erroneous clutch engagement handling control device as recited in claim 6, wherein:

the abnormality temporary determination condition further includes a second temporary determination condition where the rotation speed of the electric motor deviates more than a predetermined deviation to a low speed side from the target rotation speed, and the abnormality temporary determination means determines, based on the detection information from the rotation speed difference detection means and the detection information from the motor rotation detection means, whether or not the first temporary determination condition and the second temporary determination condition are satisfied, and for determining that the abnormality temporary determination condition is satisfied when the first temporary determination condition and the second temporary determination condition are both satisfied.

8. The erroneous clutch engagement handling control device as recited in claim 7, wherein:

the abnormality temporary determination means determines that the abnormality temporary determination condition is satisfied when a state where the first temporary determination condition and the second temporary determination condition are both satisfied has continued for more than a set time period.

* * * * *